United States Patent [19]

Yamamoto

[11] Patent Number: 5,025,679
[45] Date of Patent: Jun. 25, 1991

[54] STRUCTURE OF TILTABLE STEERING COLUMN FOR VEHICULAR STEERING SYSTEM

[75] Inventor: Yoshio Yamamoto, Shizuoka, Japan

[73] Assignee: Fuji Kiko Company, Limited, Tokyo, Japan

[21] Appl. No.: 501,607

[22] Filed: Mar. 29, 1990

[30] Foreign Application Priority Data

Mar. 31, 1989 [JP] Japan ............... 1-38038[U]

[51] Int. Cl.$^5$ ............................... B62D 1/18
[52] U.S. Cl. ......................... 74/493; 74/541; 280/775
[58] Field of Search ............ 74/493, 541; 280/775

[56] References Cited

U.S. PATENT DOCUMENTS

3,473,405 10/1969 Deford et al. ............... 74/493
4,543,848 10/1985 Beauch ....................... 74/541 X
4,594,909 6/1986 Yamaguchi ................... 74/493
4,938,093 7/1990 Matsumoto et al. ............ 74/493

Primary Examiner—Allan D. Herrmann
Assistant Examiner—David W. Laub
Attorney, Agent, or Firm—Bachman & LaPointe

[57] ABSTRACT

A structure of a tiltable steering column applicable to a steering column of a vehicular steering system having a jump-up mechanism is disclosed in which a substantially flat rod member serving as a lock plate is formed with a plurality of parallel lock grooves aligned on at least one surface of the lock plate, i.e., a pair of lock pins are extended in a space between walls of a link member for engaging and disengaging with and from the lock grooves to adjustably lock and unlock a tilt angle of a related steering shaft according to a pivotal movement of a release lever, and a shoe portion formed on the other end of the lock plate is grasped by means of a pair of rollers provided on the link member(s).

13 Claims, 6 Drawing Sheets

STRUCTURE OF TILTABLE STEERING COLUMN FOR VEHICULAR STEERING SYSTEM

BACKGROUND OF THE INVENTION (1) Field of the Invention

The present invention relates generally to a structure of a tiltable steering column for a vehicular steering system. The present invention particularly relates to the structure of the tiltable steering column in which a tilt angle of a tilt bracket, the tilt bracket being pivotally attached onto a vehicle body via a clamp, is set by an engagement and disengagement of a plurality of lock pins formed on a link member(s) with and from any of plurality of lock grooves formed on a lock plate, the lock plate being axially attached to the tilt bracket and the link member being pivoted in response to a pivotal movement of an operational lever.

(2) Description of the Background Art

A tiltable steering column is generally installed on a steering shaft axially attached onto a steering wheel. The tiltable steering column is tiltable in its upward and downward directions in a vicinity to an upper end of the steering wheel so that a driver of the vehicle can manually adjust a position of the steering wheel at an optimum drive position.

Various types of the tiltable steering columns have been proposed. For example, in one of the previously proposed tiltable steering columns, a toothed portion is formed on a constant arc portion with a tilt hinge of a tilt bracket as a center, the tilt bracket to which the steering wheel being axially attached via the steering shaft, and a tooth member having a toothed portion engageable with the toothed portion of the tilt bracket is axially supported on a clamp, the clamp being fixed to a vehicle body so as to enable cooperation with a lever.

In the above-described structure of the previously proposed tiltable steering column, the meshed engagement of both toothed portions permit the set angle of the tiltable steering column to be held there at. Therefore, if a weight imposed on the tilt bracket becomes increased, a possibility of defects of the toothed portions will become high. Hence, since an air bag system has been installed on the steering column, in recent years, the possibility of defects of the toothed portions will become increasingly higher due to a low rigidity of the steering column.

To cope with the above-described drawback, another structure of the tiltable steering column has been proposed which has a relatively high rigidity and can rigidly maintain the set tilt angle.

This is exemplified by a U.S. Pat. No. 3,473,405.

In the United States patent identified above, a lock plate is axially attached on the tilt bracket and is rotatable by means of an operational lever. Lock grooves are inscribed along a width direction of the tilt bracket and are extended with predetermined intervals in an elongated direction of the tilt bracket. A lock pin engageable with each lock groove is extended from an arc extended portion of a fixing portion. When the lock pin is disengaged from any one of the lock grooves by means of a lock plate pivoting with an axle engaged with a recessed portion as a center by means of an operation of the lever. Thus, the tilt bracket is enabled to pivot with respect to the fixing portion. The tilt bracket 1 is pivoted through a desired angle and the operational lever is stopped pivoting. At this time, the desired tilt angle can be set with the lock pin engaged with any other lock pin.

However, in the above-identified United States patent, each radius of curvature formed by the respective lock grooves is varied at each position of the lock grooves when the set tilt angle of the tilt bracket is varied. Therefore, it is necessary to change each shape of the lock grooves since each outer profile of the lock grooves is varied in terms of a locking performance and locking rigidities. An assembly working for each lock groove is needed in accordance with each position of the lock grooves. Therefore, a self-contained tool is needed and accordingly requires high cost. In addition, productivity thereof becomes low and cost of manufacturing the tilt bracket becomes increased. Furthermore, a special technique of working the grooves is needed to assemble the steering column.

SUMMARY OF THE INVENTION

It is an object of the present invention to provide an improved structure of a tiltable steering column for a vehicular steering system which can solve the above-described problems, i.e., can easily be manufactured with less cost and with no special technique and tools.

The above-described object can be achieved by providing a structure of a tiltable steering column, comprising: a) a bracket member through which a steering shaft linked to a steering wheel is inserted, the bracket member being pivotally fixed to a predetermined position of a vehicle body; b) a rod member having a flat surface, one end of which is fixed to the bracket member so as to tilt the bracket member with respect to the vehicle body; c) a plurality of lock grooves, each lock groove having the same profile, aligned on at least one flat surface of the rod member, and being capable of receiving a lock pin so as to adjustably lock a tilt angle of the steering shaft through the bracket member with respect to the vehicle body; d) a lever; and e) first means, fixed to the vehicle body and linked to the lever, for slidably grasping a shoe portion formed on the other end of the rod member and for engaging and disengaging the lock pin with and from any one of the lock grooves when the lever is pivoted.

The above-described object can also be achieved by providing a structure of a tiltable steering column applicable to a vehicular steering system, comprising: a) a tilt bracket, pivotally attached to a clamp via tilt hinges, the clamp being fixed to a vehicle body, the tilt bracket being linked to a jacket through which a steering shaft is coaxially inserted, the steering shaft being linked to a universal joint at its lower end and penetrated through the clamp, the steering shaft being linked to a steering lower tube; b) a lock plate of a rod shape, one end of which is fixed to the tilt bracket so as to tilt the tilt bracket with respect to the vehicle body, thus a steering position for a vehicular driver being adjusted; c) a plurality of lock grooves, each lock groove having the same profile, aligned on at least one flat surface of the lock plate, and being capable of receiving a lock pin so as to adjustably lock a tilt angle of the steering shaft through the tilt bracket with respect to the vehicle body; d) an pivotable lever; and e) first means, fixed to the clamp and linked to the pivotable lever, for slidably grasping a shoe portion formed on the other end of the lock plate and for engaging and disengaging the lock pin with and from any one of the lock grooves when the lever is pivoted.

DETAILED DESCRIPTION OF THE PREFERRED EMBODIMENTS

Reference will, hereinafter, be made to the drawings in order to facilitate a better understanding of the present invention.

FIGS. 1 through 4 show a first preferred embodiment of a tiltable steering column according to the present invention.

As shown in FIGS. 1 through 4, an L shaped clamp 12 is fixed to a vehicle body 11 via sliders 10, 10. The tiltable steering column includes a tilt bracket 14 pivotally supported on the clamp 12 via tilt hinges 13, 13. A jacket 15 is fixed and linked to the tilt bracket 14. A steering shaft 16 is inserted coaxially into the jacket 15. A lower end of the steering shaft 16 is linked to a universal joint 17. The universal joint 17 is linked to a steering lower tube 18. A steering lower shaft 19 is coaxially and telescopically fitted into the steering lower tube 18 via serration and resin molds 20, 20. An intermediate shaft (not shown) is linked to a lower end of the steering lower shaft 19 via another universal joint 21. On the other hand, the clamp 12 is linked to an upper jacket 22. A lower jacket 24 is coaxially and telescopically fitted into the upper jacket 22 via a spacer 23. The spacer 23 is provided with balls. Numeral 25 denotes a lower clamp.

Figure 4:
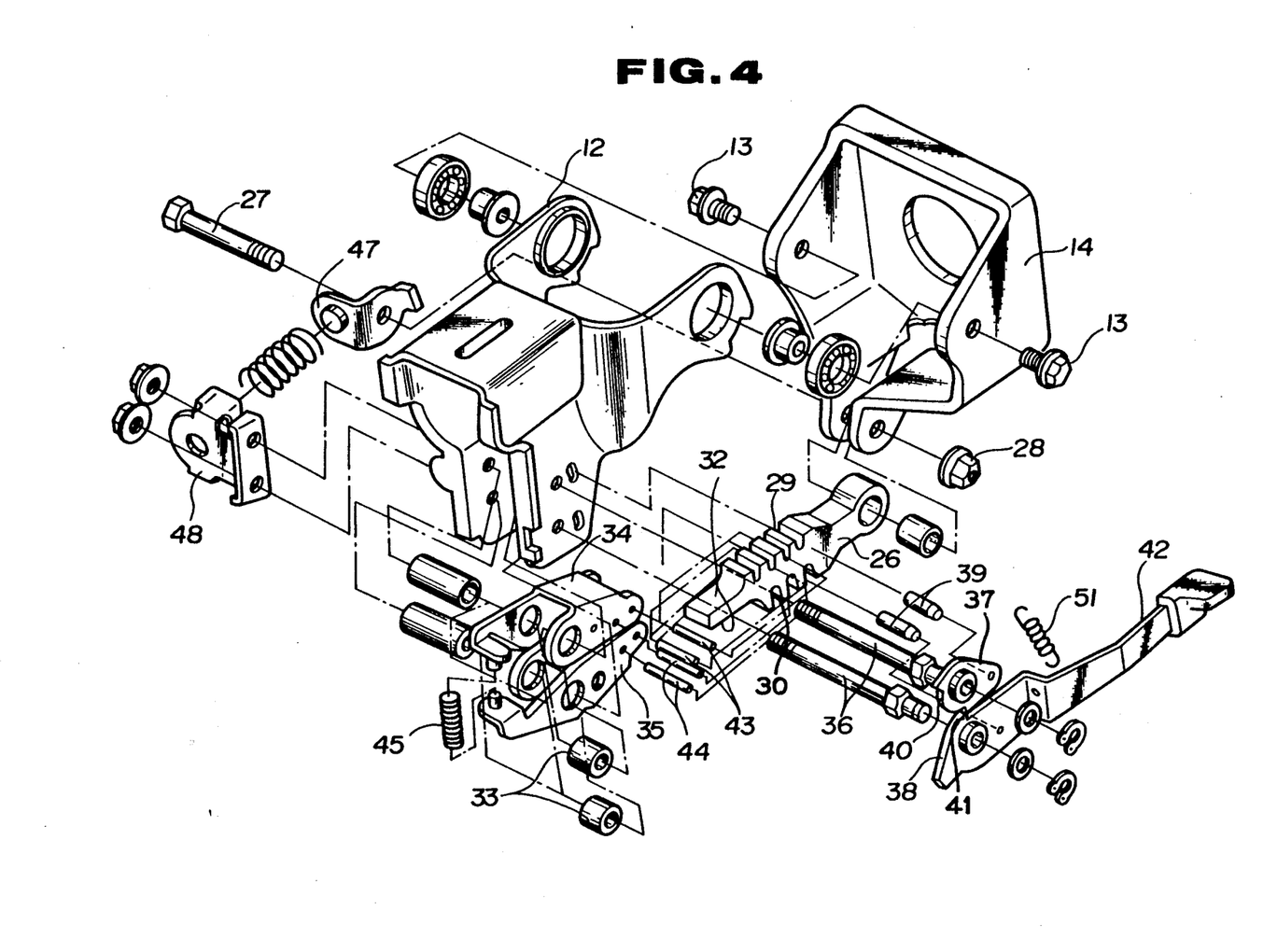
FIG. 4 is a perspective view of an essential part of the steering column shown in FIGS. 1 through 3.

Referring to FIG. 4, a bolt 27 is used to link pivotally one end of the lock plate 26 to a lower end of the tilt bracket 14. The bolt 27 is fixed permanently to the lower end of the tilt bracket 14 by means of a nut 28.

A lock plate 26 is formed of an elongated rod shape having a predetermined lateral length. Lock grooves 29, 30 are formed in a width direction of the lock plate 26 and aligned with predetermined spatial intervals in the elongate direction of the lock plate 26 at both upper and rear side surfaces thereof. A shoe 32 having a predetermined length and gradually thinned at its tip end is formed on the other end of the lock plate 26.

The lock grooves 29, 30 have curvatures corresponding to concentric circle trajectories along which lock pins 43, 44 are respectively pivoted with axles 36, 36 as centers so as to tightly receive the lock pins 43, 44. It is noted that one lock groove group 30 has the same pitch as the other lock groove group 29 or alternatively has a half pitch deviated from the other lock groove group 29 (as typically shown in FIG. 4).

If the pitches between the one and other lock groove groups 29, 30 are the same, the lock pins 43, 44 are simultaneously engaged with the corresponding lock grooves 29, 30, respectively. If both pitches of the lock groove groups 29, 30 are deviated by the half pitch, either one of both lock pins 43, 44 is engaged with the lock grooves 29, 30 while the other thereof is disengaged from the corresponding lock groove group 29, 30.

An upper link 34 and lower link 35 (link members) having rollers 33, 33, respectively, serving to integrally grasp upper and lower sides of the shoe 32 under pressure are pivotally supported on the clamp 12 via axles 36, 36. Release cams 37, 38 are integrally and rotatably supported onto the upper link 34 and the lower link 35 by means of pins 39, 39, respectively. The pins 39, 39 are extended between the release cam 37 and clamp 12 and between the release cam portion 38 and clamp 12, respectively. The upper link 34 and lower link 35 are, respectively, integrated in a letter C shape of cross section. A cut out portion 40 having an arc shape is provided on the release cam 37. The release cam 38 is integrally formed with a projection 41 and a release lever 42, both projection 41 and release lever 42 being engaged with the cut out portion 40.

A pair of lock pins 43, 44 are respectively installed on one ends of upper link 34 and lower link 35. The lock pins 43, 44 are engageable with lock grooves 29, 30, respectively. A compressive lock spring 45 is extended between the other ends of the upper link 34 and lower link 35 so that the upper link 34 and lower link 35 are biased so as to be mutually contacted against each other.

It is noted that a return spring 51 is extended between a part of the release lever 42 and axle 36 so as to bias the release lever 42 to always pivot upward.

It is also noted that one end of a jump-up spring 46 is linked to a side end of the tilt bracket 14 via a convexed spring receiver 47 linked with a bolt 27 thereto. The other end of the jump-up spring 46 is linked via a cylindrical spring receiver 48 to the clamp 12. The jump-up spring 46 is of a compressive type and has a sufficient force to pivot the tilt bracket 14 with respect to the clamp 12 with the tilt hinges 13, 13 as a center.

Figure 1:
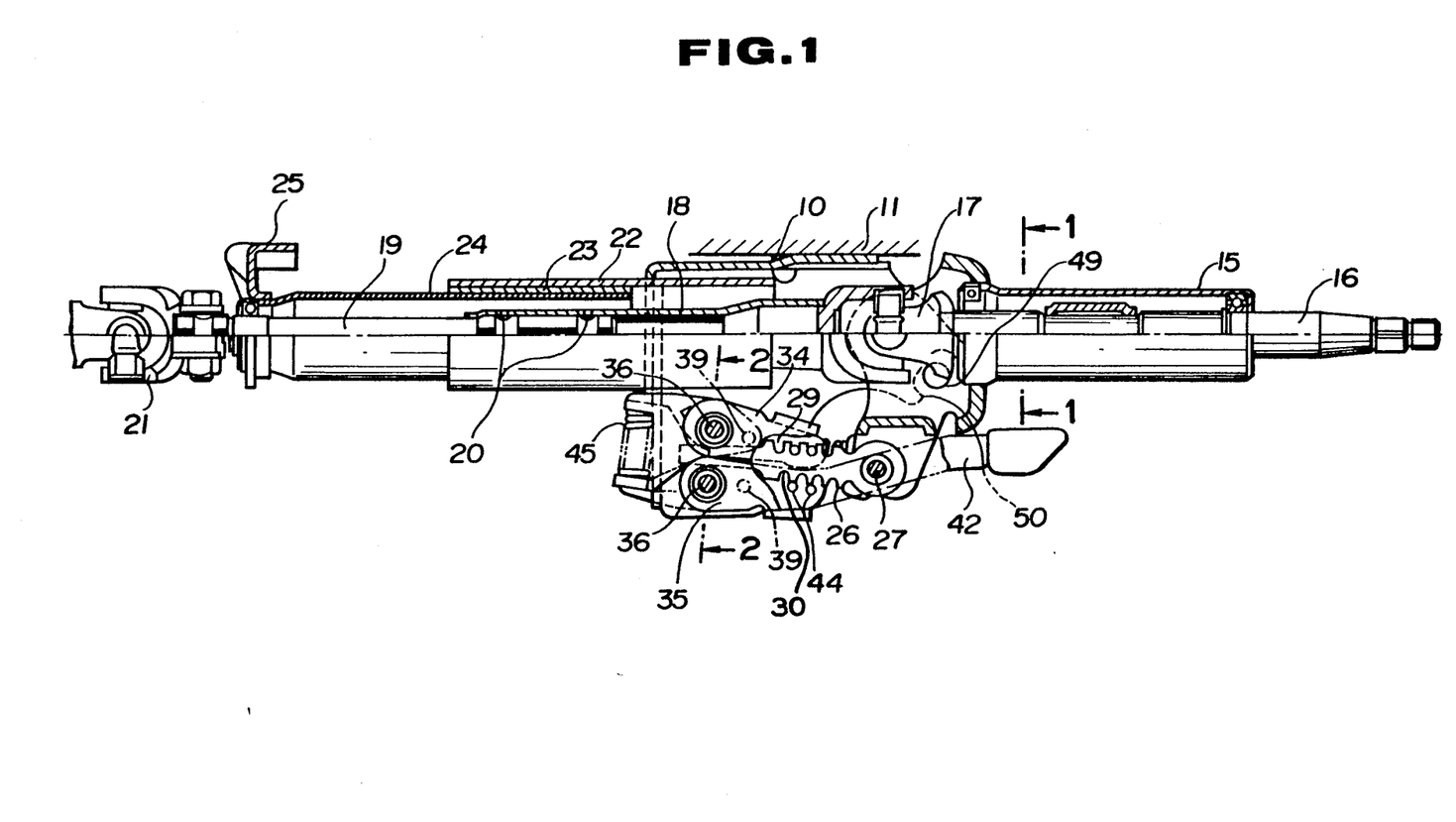
FIG. 1 is a partially sectioned side view of a tiltable steering column in a first preferred embodiment according to the present invention.
Figure 2:
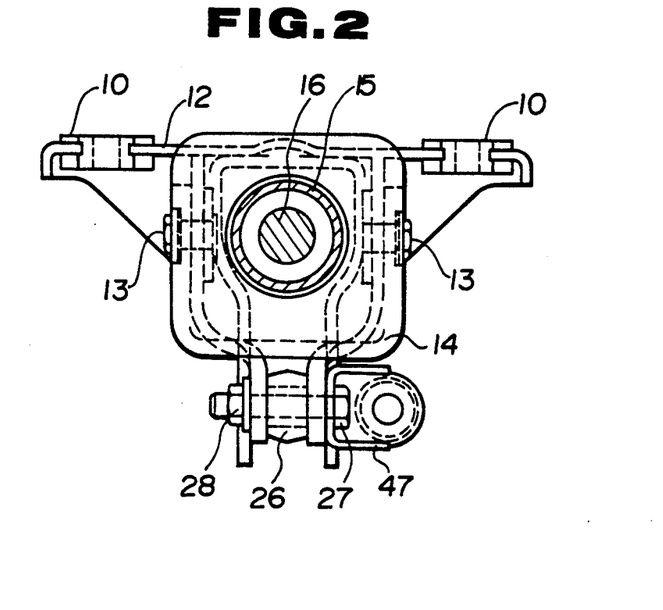
FIG. 2 is a cross sectioned view of the steering column cut away along a line 1—1 FIG. 1.
Figure 3:
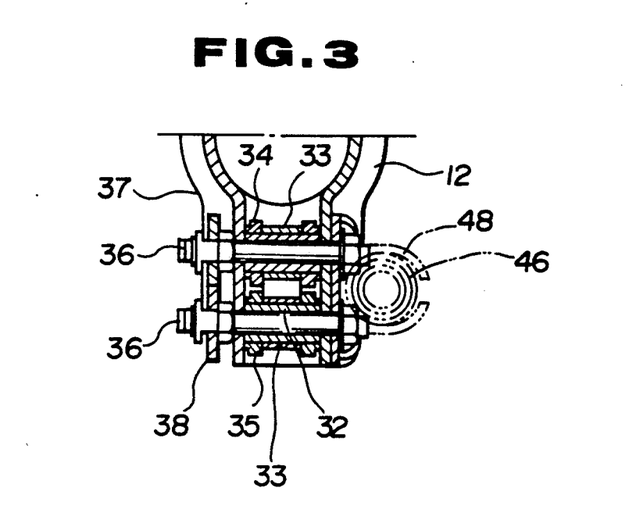
FIG. 3 is a cross sectioned view of the steering column cut away along a line 2—2 of FIG. 1.

As shown in FIG. 1, a stopper pin 49 is projected on one side end of the tilt bracket 14. In addition, an arc cut out 50 is formed with the tilt hinge 13 as a center. The stopper pin 49 is engaged with the cut out 50 to prevent the complete rotation of the tilt bracket 14.

Next, an operation of the first preferred embodiment will be described below.

In FIG. 1, when the release lever 42 is pressed down to pivot in a clockwise direction by the driver, the lower link 35 is pivoted in the same clockwise direction via the lock pin 39 with the corresponding axle 36 as a center so that the projection 41 of the corresponding one of the release cams 38 presses one end of the cut out 40 of the other release cam 38 to pivot the release cam 37 in an anticlockwise direction. Hence, the upper link 34 and lower link 35 are pivoted mutually in opposite directions. When the lock pins 43, 44 are disengaged from the lock grooves 29, 30, the shoe 32 of the lock plate 26 is placed in a state in which the shoe 32 is only grasped with the pivotable rollers 33, 33. Hence, the tilt bracket 14 is pivoted in an anticlockwise direction with the tilt hinges 13, 13 as a center.

In other words, a, so-called, Jump-up operation of the steering wheel to an uppermost position is carried out. In order to set a desired tilt angle for the driver, the tilt bracket 4 is pressed down together with the steering shaft and steering wheel, in the clockwise direction so as to pivot the tilt bracket 14 in the clockwise (downward) direction. Then, when the tilt bracket 14 is stopped at the desired tilt angle, the press down of the release lever 42 is released. At this time, both upper link 34 and lower link 35 are pivoted in a direction toward which both lock pins 43, 44 mutually approach with the axles 36, 36 as a center by means of a force of the lock spring 45. The lock pins 43, 44 engage any two of the corresponding lock groove groups 29, 30 and a tilt operation to set the tilt angle of the tilt bracket 14 is ended.

It is noted that either of the pair of the lock pins 43, 44 which is not engaged with the corresponding lock grooves, in a case when both of the lock groove groups 29, 30 are mutually deviated by half pitch, is rested on a position outside from the positions of the corresponding lock grooves 29, 30. A minute angle adjustment by half pitch can be made when the lock grooves 29, 30 are mutually deviated by half pitch. If neither of them are deviated, i.e., the same pitch, a strength of the lock can, in turn, be more increased. Such a locked state can be maintained by means of a movement of the links 34, 35 caused by the lock spring 45.

FIGS. 5 through 8 show a second preferred embodiment of the tiltable steering column according to the present invention.

In this embodiment, a plurality of lock grooves 29 are formed in a width direction of the lock plate 26 and are aligned on one side surface with equal spatial intervals in an elongate direction thereof.

In addition, in this embodiment, one link 34 and bushes 35 having rollers 33, 37 are pivotally and swingably supported on the clamp 12 via axles with bolts 36, 36. The rollers 33, 37 serve to grasp the shoe 32 at both sides thereof and are contacted with the shoe 32 under pressure. The release lever 42 is axially attached onto one axle 36 so as to enable pivotal movement together with the link 34 and release pin 39. The link 34 is constituted by a letter U shaped member. One end of the link 34 is provided with a pair of lock pins 43 engageable and disengageable with any consecutive lock grooves 29. The lock grooves 29 are formed on the upper surface of the rod-shaped lock plate 26. The other end of the link 34 is provided with a compressive spring 45 to bias the link 34 to be tightly contacted with the lock plate 26 at the lock pin side.

Furthermore, a return spring 51 is extended between a part of the release lever 42 and one axle 36 so that the release lever 42 is always biased upward.

The other structures of the second preferred embodiment are the same as those in the first preferred embodiment.

The operation of the second preferred embodiment will be described below.

Figure 5:
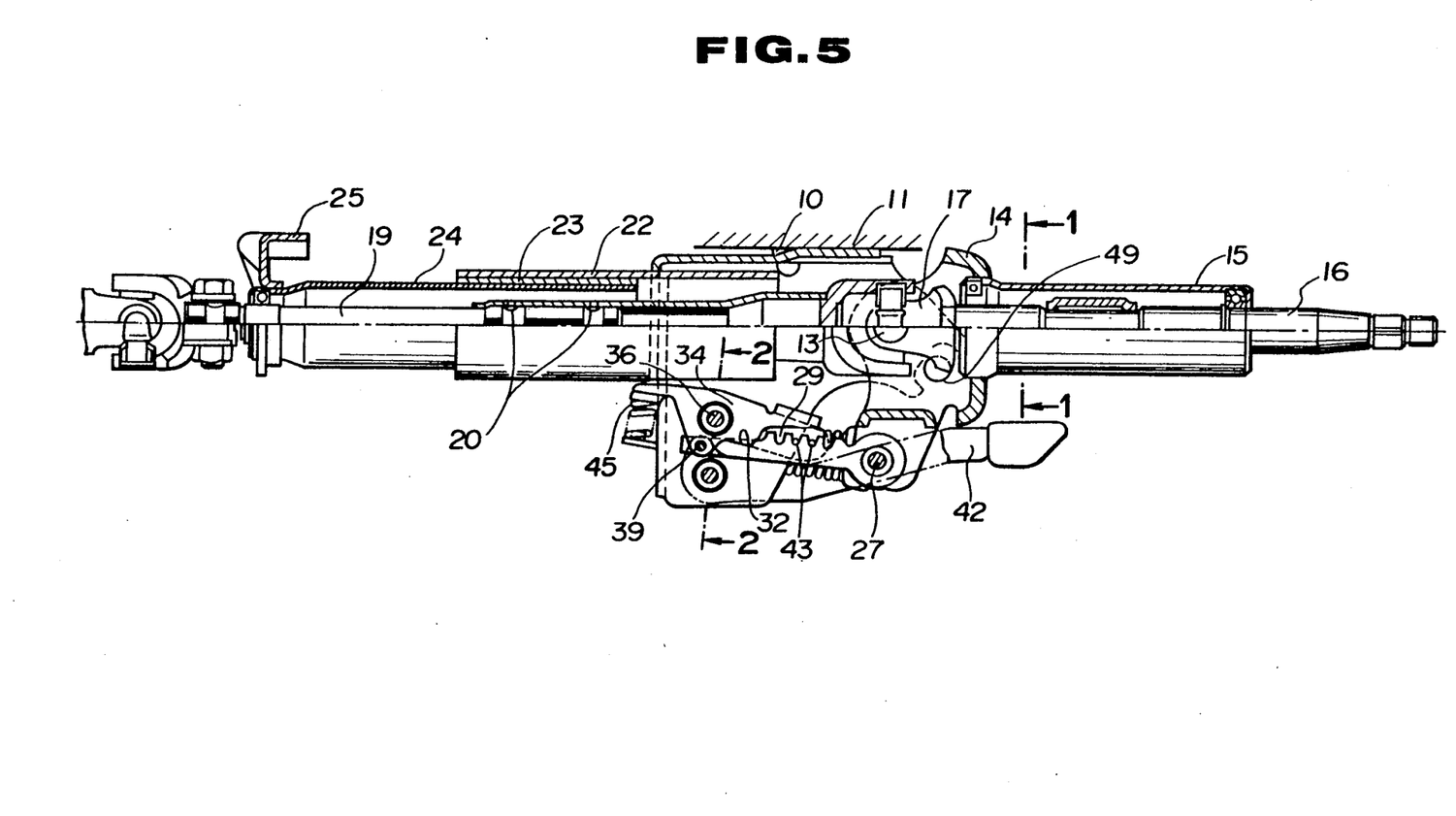
FIG. 5 is a partially cross sectioned side view of a tiltable steering column in a second preferred embodiment according to the present invention.
Figure 6:
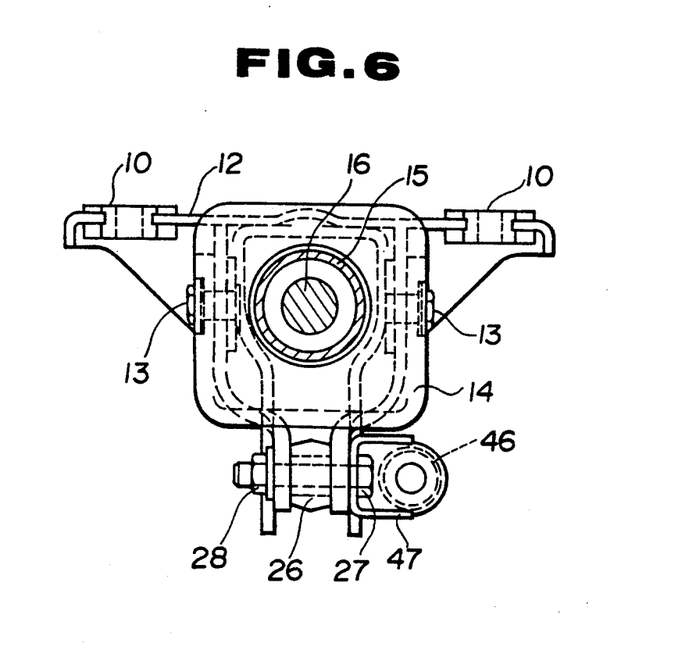
FIG. 6 is a cross sectioned view of the steering column cut away along the line 1—1 of FIG. 5.
Figure 7:
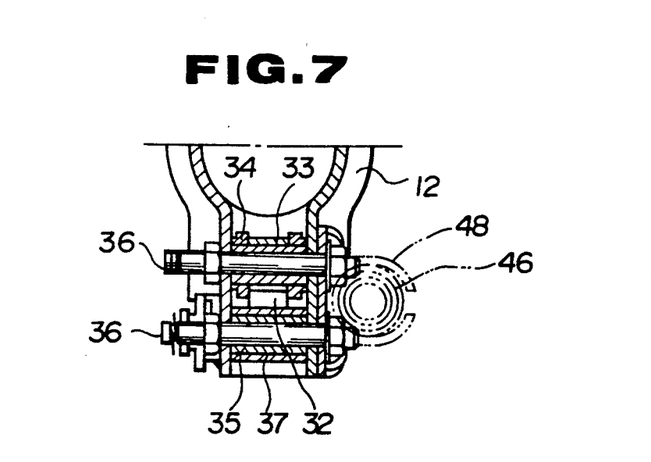
FIG. 7 is a cross sectioned view of the steering column cut away along the line 2—2 of FIG. 5.
Figure 8:
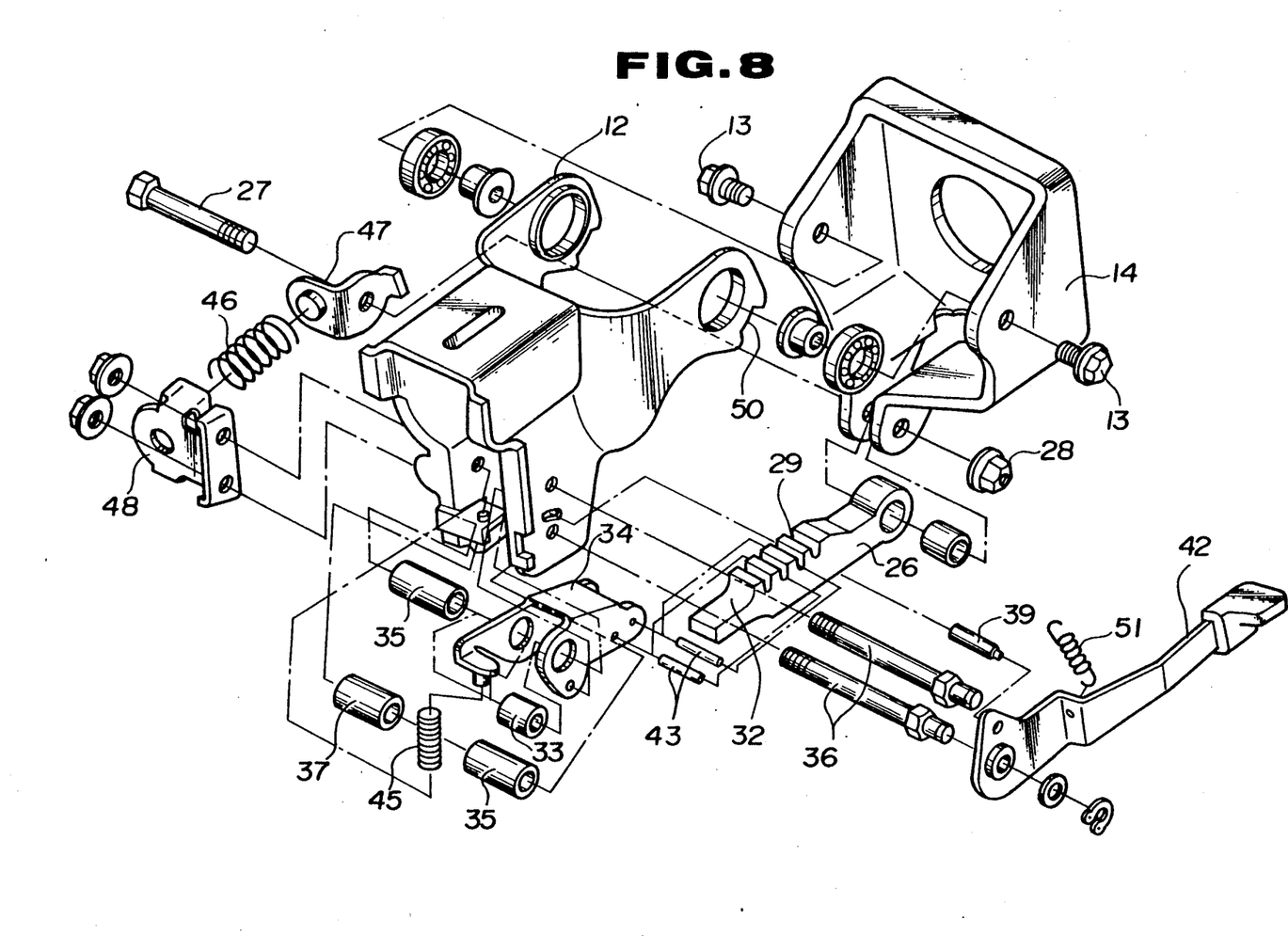
FIG. 8 is a perspective view of an essential part of the steering column shown in FIGS. 5 through 7.

Referring to FIG. 5, when the release lever 42 is pressed down, the link 34 is pivoted in the counterclockwise direction with the one axle 36 as a center via the release pin 39. When the lock pin 43 is disengaged of the consecutive lock grooves 29, the shoe 32 of the lock plate 26 is only grasped with the pair of rollers 33, 37. A force of the jump-up spring 46 causes the tilt bracket 14 to be pivoted with the tilt hinges 13, 13 as a center in the counterclockwise direction (jump-up operation).

When the tilt bracket 14 is pivoted in the clockwise direction (downward) through the steering wheel by the driver to set the tilt angle and stopped pivoting with the pressing down of the lever 42 released, the link 34 is pivoted in the direction in which the lock pin 43 is biased with the axle 36 as a center by means of a force of the lock spring 45. The lock pins 43 are engaged with any two consecutive lock grooves 29. Hence, the tilt angle of the tilt bracket 14 can be set according to the angle adjustment of the pitch of the lock grooves 29. The lock state can be maintained by means of a movement of the link 34.

As described hereinabove, in the tiltable steering column according to the present invention, a flat rod-shaped lock plate is provided on at least one elongated surface of which a plurality of lock grooves are formed at equal intervals (corresponding to a distance between the look pins) along the elongated direction, one end of the lock plate being axially attached to the tilt bracket and at least one link for grasping the other end, i.e., shoe portion of the lock plate is provided, the link having lock pins engageable with and disengageable from any of the lock grooves and being biased so as to enable pivotal movement of the link. Therefore, the respective lock grooves have the same profiles and aligned straight along the axially sliding direction of the lock plate, the distance between each lock groove is substantially equal. The cost of manufacturing the tiltable steering column becomes decreased. No special tool and equipment for assembly the steering column is required. In addition, since the other end of the lock plate is grasped by means of the link member(s), an escape of the lock plate against the movement during the lock operation can be prevented so that the rigidity of the steering column can be increased. Furthermore, since the pair of rollers serve to grasp the other end of the lock plate, a slide resistance against the lock plate can be decreased. The performance of jump-up mechanism in the steering column can be improved.

It will fully be appreciated by those skilled in the art that the foregoing description has been made in terms of the preferred embodiments and various changes and modifications may be made without departing from the scope of the present invention which is to be defined by the appended claims.

What is claimed is:

1. A structure of a tiltable steering column, comprising:
   a) a bracket member through which a steering shaft linked to a steering wheel is inserted, the bracket member being pivotally fixed to a predetermined position of a vehicle body;
   b) a rod member having a flat surface, one end of which is fixed to the bracket member so as to tilt the bracket member with respect to the vehicle body;
   c) a plurality of lock grooves, each lock groove having the same profile, aligned on at least one flat surface of the rod member, and being capable of receiving a lock pin so as to adjustably lock a tilt angle of the steering shaft through the bracket member with respect to the vehicle body;
   d) a lever; and
   e) first means, fixed to the vehicle body and linked to the lever, for slidably grasping a shoe portion formed on the other end of the rod member and for engaging and disengaging the lock pin with and from any one of the lock grooves when the lever is pivoted.

2. A structure of the tiltable steering column as set forth in claim 1, wherein the lock grooves are aligned on upper and lower surfaces of the rod member with equal spatial intervals in the elongated direction.

3. A structure of the tiltable steering column as set forth in claim 2, wherein the first means includes a pair of link members grasping the shoe portion of the rod member and having a plurality of parallel lock pins on respective one end thereof, the link members being axially attached onto the vehicle body via a clamp member and being biased so that the lock pins attached to each link member mutually approach and the lock pins attached to one link member being separated from those attached to the other link member when the lever is pivoted in a first direction.

4. A structure of the tiltable steering column as set forth in claim 3, wherein each link member is provided with a roller for grasping the shoe portion of the rod member together with the other roller and a compressive spring is extended between both ends of the pair of link members.

5. A structure of the tiltable steering column as set forth in claim 4, wherein one end of the lever is provided with a release cam, linked to the pair of the link members, for disengaging the lock pins from the engaged lock grooves when the lever is pivoted in the first direction.

6. A structure of the tiltable steering column as set forth in claim 4, wherein a jump-up mechanism is provided between the bracket member and clamp member and associated with the lever for jumping up the bracket member to an uppermost position when the lever is pivoted in the first direction.

7. A structure of the tiltable steering column as set forth in claim 4, wherein one lock pin provided on each corresponding link member has separated from the other lock pin provided thereon by an equal distance and wherein a pitch of the lock grooves formed on the upper flat surface of the rod member is the same as that of the lock grooves formed on the rear flat surface of the rod member.

8. A structure of the tiltable steering column as set forth in claim 4, wherein one lock pin provided on each corresponding link member has separated from the other lock pin provided thereon by an equal distance and wherein a pitch of the lock grooves formed on the upper flat surface of the rod member is deviated from that of the lock grooves formed on the rear flat surface of the rod member.

9. A structure of the tiltable steering column as set forth in claim 8, wherein one lock pin provided on each corresponding link member has separated from the other lock pin provided thereon by an equal distance and wherein a pitch of the lock grooves formed on the upper flat surface of the rod member is deviated by a half pitch from that of the lock grooves formed on the rear flat surface of the rod member.

10. A structure of the tiltable steering column as set forth in claim 1, wherein the lock grooves are formed on an upper flat surface of the rod member.

11. A structure of the tiltable steering column as set forth in claim 10, wherein the first means includes a link member having parallel lock pins at one end thereof so as to enable the engagement and disengagement with and from any of the lock grooves, the link member being axially attached to the vehicle body via a clamp member so as to enable a slidable movement of the link member above the lock grooves and being linked to the lever at the other end thereof so that the lock pins are disengaged from the engaged lock grooves when the lever is pivoted in a predetermined direction.

12. A structure of the tiltable steering column as set forth in claim 11, wherein the link member is provided with rollers grasping the shoe portion of the rod member.

13. A structure of a tiltable steering column applicable to a vehicular steering system, comprising:

a) a tilt bracket, pivotally attached to a clamp via tilt hinges, the clamp being fixed to a vehicle body, the tilt bracket being linked to a jacket through which a steering shaft is coaxially inserted, the steering shaft being linked to a universal joint at its lower end and penetrated through the clamp, the steering shaft being linked to a steering lower tube.

b) a lock plate of a rod shape, one end of which is fixed to the tilt bracket so as to tilt the tilt bracket with respect to the vehicle body, thus a steering position for a vehicular driver being adjusted;

c) a plurality of lock grooves, each lock groove having the same profile, aligned on at least one flat surface of the lock plate, and being capable of receiving a lock pin so as to adjustably lock a tilt angle of the steering shaft through the tilt bracket with respect to the vehicle body;

d) an pivotable lever; and e) first means, fixed to the clamp and linked to the pivotable lever, for slidably grasping a shoe portion formed on the other end of the lock plate and for engaging and disengaging the lock pin with and from any one of the lock grooves when the lever is pivoted.

* * * * *